(12) United States Patent
Liu et al.

(10) Patent No.: US 9,395,846 B2
(45) Date of Patent: Jul. 19, 2016

(54) TOUCH SCREEN HAVING A FILTER FOR FILTERING INTERFERING LIGHT SIGNALS

(75) Inventors: Jianjun Liu, Beijing (CN); Xinlin Ye, Beijing (CN); Xinbin Liu, Beijing (CN)

(73) Assignee: BEIJING IRTOUCH SYSTEMS CO., LTD, Beijing (CN)

( * ) Notice: Subject to any disclaimer, the term of this patent is extended or adjusted under 35 U.S.C. 154(b) by 148 days.

(21) Appl. No.: 13/811,339

(22) PCT Filed: Jul. 19, 2011

(86) PCT No.: PCT/CN2011/077312
§ 371 (c)(1),
(2), (4) Date: Jan. 21, 2013

(87) PCT Pub. No.: WO2012/010078
PCT Pub. Date: Jan. 26, 2012

(65) Prior Publication Data
US 2013/0120320 A1 May 16, 2013

(30) Foreign Application Priority Data
Jul. 21, 2010 (CN) .......................... 2010 1 0235151

(51) Int. Cl.
*G06F 3/042* (2006.01)
*G06F 3/041* (2006.01)

(52) U.S. Cl.
CPC .............. *G06F 3/042* (2013.01); *G06F 3/0416* (2013.01); *G06F 3/0421* (2013.01); *G06F 3/0428* (2013.01)

(58) Field of Classification Search
CPC ............................. G06F 3/0421; G06F 3/0428
USPC ........................................................... 345/175
See application file for complete search history.

(56) References Cited

U.S. PATENT DOCUMENTS

| 4,710,760 | A * | 12/1987 | Kasday .......................... 345/175 |
| 5,164,714 | A * | 11/1992 | Wehrer .......................... 345/175 |
| 6,429,857 | B1 * | 8/2002 | Masters et al. ................. 345/175 |
| 2002/0084980 | A1 * | 7/2002 | White ................... G06F 3/0346 345/157 |
| 2006/0114119 | A1 * | 6/2006 | Matsumura et al. .......... 340/825 |
| 2011/0074676 | A1 * | 3/2011 | Gao et al. ....................... 345/158 |

FOREIGN PATENT DOCUMENTS

| CN | 101067775 | 11/2007 |
| CN | 101359266 | 2/2009 |
| CN | 101477428 | 7/2009 |
| CN | 201522698 | 7/2010 |

* cited by examiner

*Primary Examiner* — Long D Pham
(74) *Attorney, Agent, or Firm* — Harness, Dickey & Pierce, P.L.C.

(57) ABSTRACT

A touch screen and a multi-channel sampling method thereof are disclosed. The touch screen comprises infrared-emitting diodes, infrared-receiving diodes, a touch detection region, first-stage processing circuits, and a second-stage processing circuit. At least two infrared-receiving diodes receive infrared light emitted from the same infrared light-emitting diode simultaneously, and the at least two infrared-receiving diodes output the received signals to the second-stage processing circuit for processing after the first-stage processing circuits filter out interfering light signals. The touch screen and the multi-channel sampling method thereof according to the present invention can be used to increase the multi-channel sampling rate of the touch screen.

14 Claims, 10 Drawing Sheets

TOUCH SCREEN HAVING A FILTER FOR FILTERING INTERFERING LIGHT SIGNALS

TECHNICAL FIELD OF THE INVENTION

The present invention relates to the field of photoelectric technology, and particularly to a touch screen and a method of multi-channel sampling, and also to a touch device, a touch system and an interactive display based on the touch screen.

BACKGROUND OF THE INVENTION

With development of touch technology, there are two main requirements for a touch screen, one is to increase the size of the touch screen with the development of display technology, and the other is to increase resolution of the touch screen due to an application such as handwriting recognition, gesture recognition, mapping and the like.

To improve the resolution of the touch screen, the most effective technique is to increase the number of infrared-receiving diodes, but this will bring difficulty to design and production of the touch screen. Moreover the increase in the number of elements means an increase in cost. In this method, due to the increase in the number of sensors, the response rate of the touch screen will certainly be affected.

Without increasing the number of infrared emitting and receiving diodes, the resolution can be improved through off-axis scanning (i.e., infrared light emitted by one infrared-emitting diode can be received by a plurality of infrared-receiving diodes), but such scanning greatly affects the response rate of the touch screen. Since it is necessary to perform an anti-interference light processing before detecting the signal of the infrared-receiving diodes, assuming that the response time of a first-stage processing circuit (for example, including a sampling holding circuit and an analog subtractor) to filter out the interfering light from the received signal of each infrared-receiving diode is $t1$, and the response time for switching operation of a multiplexer is $t0$, then in the case that there are one infrared-emitting diode and $n$ ($n \geq 2$) infrared-receiving diodes, the total time is $T0=nt1+(n-1)*t0$, whereby the response rate is too small and the practical effect is poor.

SUMMARY OF THE INVENTION

In view of the existing problems in the prior art, the present invention proposes a touch screen, a method of multi-channel sampling for a touch screen, a touch device, a touch system and an interactive display, which facilitates to increase the multi-channel sampling rate.

According to an aspect of the present invention, there is provided a touch screen which comprises infrared-emitting diodes, infrared-receiving diodes, a touch detection region, first-stage processing circuits, and a second-stage processing circuit, wherein at least two infrared-receiving diodes receive infrared light emitted from the same infrared light-emitting diode simultaneously, and the first-stage processing circuits filter out interfering light signals from the signals received by the at least two infrared-receiving diodes, and then output the signals to the second-stage processing circuit for processing.

Alternatively, the first-stage processing circuits filters out the interfering light signals from the signals received by the at least two infrared-receiving diodes simultaneously, and then output the signals to the second-stage processing circuit for processing.

Alternatively, the second-stage processing circuit comprises a microprocessor.

Alternatively, the number of the first-stage processing circuits equals to the number of the at least two infrared-receiving diodes, and there is a one-to-one relationship between the first-stage processing circuits and the at least two infrared-receiving diodes.

Alternatively, the first-stage processing circuits filter out the interfering light signals from the signals received by the at least two infrared-receiving diodes, and then output the signals to the second-stage processing circuit via a multiplexer.

Alternatively, the multiplexer is a multi-channel-to-one-channel multiplexer.

Alternatively, an amplifier and an A/D converter are connected in series between the multiplexer and the second-stage processing circuit.

Alternatively, the amplifier is an automatic gain amplifier.

Alternatively, the first-stage processing circuit comprises a sampling holding circuit and an analog subtractor.

Alternatively, the first-stage processing circuit comprises a capacitor and an analog switch, the capacitor being connected between the infrared-receiving diode and the multiplexer, one end of the analog switch being connected to a circuit node between the capacitor and the multiplexer, and the other end of the analog switch being connected to a reference potential.

Alternatively, the analog switch is closed to connect the reference potential when the infrared-emitting diode does not emit the infrared light, and the analog switch is opened when the infrared-emitting diode emits the infrared light.

Alternatively, all of the analog switches are connected to the same reference potential.

According to another aspect of the present invention, there is provided a method of multi-channel sampling for a touch screen, wherein the touch screen comprises infrared-emitting diodes, infrared-receiving diodes, a touch detection region, first-stage processing circuits, and a second-stage processing circuit. The method comprises: driving at least two infrared-receiving diodes to receive infrared light emitted from the same infrared light-emitting diode simultaneously; and the first-stage processing circuits filtering out interfering light signals from the received signals of at least two infrared-receiving diodes to obtain valid signals and outputting all of the valid signals to the second-stage processing circuit for processing.

Alternatively, the first-stage processing circuit filters out the interfering light signals from the received signals of at least two infrared-receiving diodes simultaneously.

Alternatively, the number of the first-stage processing circuits equals to the number of the infrared-receiving diodes, and there is a one-to-one relationship between the first-stage processing circuits and the infrared-receiving diodes.

Alternatively, a multiplexer is connected between the first-stage processing circuits and the second-stage processing circuit, and the valid signals are outputted to the second-stage processing circuit via the multiplexer.

Alternatively, the multiplexer is a multi-channel-to-one-channel multiplexer.

Alternatively, an amplifier and an A/D converter are connected in series between the multiplexer and the second-stage processing circuit.

Alternatively, the amplifier is an automatic gain amplifier.

Alternatively, the first-stage processing circuit comprises a sampling holding circuit and an analog subtractor.

Alternatively, the first-stage processing circuit comprises a capacitor and an analog switch, the capacitor being connected between the infrared-receiving diode and the multiplexer, one end of the analog switch being connected to a circuit node between the capacitor and the multiplexer, and the other end of the analog switch being connected to a reference potential.

Alternatively, the analog switch is closed to connect the reference potential when the infrared-emitting diode does not emit the infrared light, and the analog switch is opened when the infrared-emitting diode emits the infrared light.

Alternatively, all of the analog switches are connected to the same reference potential.

According to another aspect of the present invention, there is provided a touch device which comprises infrared-emitting diodes, infrared-receiving diodes, a touch detection region, first-stage processing circuits, and a second-stage processing circuit, and further comprises: a driving module that drives at least two infrared-receiving diodes to receive infrared light emitted from the same infrared light-emitting diode simultaneously; and a control module that controls the first-stage processing circuits to filter out interfering light signals from the received signals of at least two infrared-receiving diodes to obtain valid signals and outputs all of the valid signals to the second-stage processing circuit.

Alternatively, the second-stage processing circuit comprises a microprocessor, and the driving module and the control module are loaded in the microprocessor.

Alternatively, the control module controls the first-stage processing circuit to filter out the interfering light signals from the received signals of the at least two infrared-receiving diodes simultaneously.

Alternatively, the number of the first-stage processing circuits equals to the number of the infrared-receiving diodes, and there is a one-to-one relationship between the first-stage processing circuits and the infrared-receiving diodes.

Alternatively, a multiplexer is connected between the first-stage processing circuits and the second-stage processing circuit, and the valid signals are outputted to the second-stage processing circuit via the multiplexer.

Alternatively, the multiplexer is a multi-channel-to-one-channel multiplexer.

Alternatively, an amplifier and an A/D converter are connected in series between the multiplexer and the second-stage processing circuit.

Alternatively, the amplifier is an automatic gain amplifier.

Alternatively, the first-stage processing circuit comprises a sampling holding circuit and an analog subtractor.

Alternatively, the first-stage processing circuit comprises a capacitor and an analog switch, the capacitor being connected between the infrared-receiving diode and the multiplexer, one end of the analog switch being connected to a circuit node between the capacitor and the multiplexer, and the other end of the analog switch being connected to a reference potential.

Alternatively, the analog switch is closed to connect the reference potential when the infrared-emitting diode does not emit the infrared light, and the analog switch is opened when the infrared-emitting diode emits the infrared light.

Alternatively, all of the analog switches are connected to the same reference potential.

According to another aspect of the present invention, there is provided a touch system which comprises a touch screen comprising infrared-emitting diodes, infrared-receiving diodes, a touch detection region, first-stage processing circuits, and a second-stage processing circuit, wherein at least two infrared-receiving diodes receive infrared light emitted from the same infrared light-emitting diode simultaneously, and the first-stage processing circuits filter out interfering light signals from the signals received by the at least two infrared-receiving diodes, and then output the signals to the second-stage processing circuit for processing.

Alternatively, the first-stage processing circuits filter out the interfering light signals from the signals received by the at least two infrared-receiving diodes simultaneously, and then output the signals to the second-stage processing circuit for processing.

Alternatively, the second-stage processing circuit comprises a microprocessor.

Alternatively, the number of the first-stage processing circuits equals to the number of the at least two infrared-receiving diodes, and there is a one-to-one relationship between the first-stage processing circuits and the infrared-receiving diodes.

Alternatively, the first-stage processing circuits filter out the interfering light signals from the signals received by the at least two infrared-receiving diodes, and then output the signals to the second-stage processing circuit via a multiplexer.

Alternatively, the multiplexer is a multi-channel-to-one-channel multiplexer.

Alternatively, an amplifier and an A/D converter are connected in series between the multiplexer and the second-stage processing circuit.

Alternatively, the amplifier is an automatic gain amplifier.

Alternatively, the first-stage processing circuit comprises a sampling holding circuit and an analog subtractor.

Alternatively, the first-stage processing circuit comprises a capacitor and an analog switch, the capacitor being connected between the infrared-receiving diode and the multiplexer, one end of the analog switch being connected to a circuit node between the capacitor and the multiplexer, and the other end of the analog switch being connected to a reference potential.

Alternatively, the analog switch is closed to connect the reference potential when the infrared-emitting diode does not emit the infrared light, and the analog switch is opened when the infrared-emitting diode emits the infrared light.

Alternatively, all of the analog switches are connected to the same reference potential.

According to another aspect of the present invention, there is provided an interactive display which comprises a display panel and a touch screen, wherein the touch screen comprises infrared-emitting diodes, infrared-receiving diodes, a touch detection region, first-stage processing circuits, and a second-stage processing circuit, wherein at least two infrared-receiving diodes receive infrared light emitted from the same infrared light-emitting diode simultaneously, and the first-stage processing circuits filter out interfering light signals from the signals received by the at least two infrared-receiving diodes, and then output the signals to the second-stage processing circuit for processing.

Alternatively, the first-stage processing circuits filter out the interfering light signals from the signals received by the at least two infrared-receiving diodes simultaneously, and then output the signals to the second-stage processing circuit for processing.

Alternatively, the second-stage processing circuit comprises a microprocessor.

Alternatively, the number of the first-stage processing circuits equals to the number of the infrared-receiving diodes, and there is a one-to-one relationship between the first-stage processing circuits and the infrared-receiving diodes.

Alternatively, the first-stage processing circuits filter out the interfering light signals from the signals received by the at least two infrared-receiving diodes, and then output the signals to the second-stage processing circuit via a multiplexer.

Alternatively, the multiplexer is a multi-channel-to-one-channel multiplexer.

Alternatively, an amplifier and an A/D converter are connected in series between the multiplexer and the second-stage processing circuit.

Alternatively, the amplifier is an automatic gain amplifier.

Alternatively, the first-stage processing circuit comprises a sampling holding circuit and an analog subtractor.

Alternatively, the first-stage processing circuit comprises a capacitor and an analog switch, the capacitor being connected between the infrared-receiving diode and the multiplexer, one end of the analog switch being connected to a circuit node between the capacitor and the multiplexer, and the other end of the analog switch being connected to a reference potential.

Alternatively, the analog switch is closed to connect the reference potential when the infrared-emitting diode does not emit the infrared light, and the analog switch is opened when the infrared-emitting diode emits the infrared light.

Alternatively, all of the analog switches are connected to the same reference potential.

The present invention has the following advantages compared with the prior art:

The touch screen according to an embodiment of the present invention makes it possible to increase the multi-channel sampling rate, by optimizing the circuit structure such that the received signals of the at least two infrared-receiving diodes which receive the infrared light emitted from the same infrared light-emitting diode simultaneously can be processed by the first-stage processing circuits and outputted via the same multiplexer to the second-stage processing circuit for processing.

The method of multi-channel sampling for a touch screen according to an embodiment of the present invention makes it possible to increase the multi-channel sampling rate, by driving at least two infrared-receiving diodes to receive the infrared light emitted from the same infrared light-emitting diode simultaneously, controlling the first-stage processing circuits to sample the received signal of each infrared-receiving diode simultaneously and filter out the interfering light signals from the received signals to obtain the valid signals, and outputting all of the valid signals via the same multiplexer to the second-stage processing circuit for processing.

The touch device according to an embodiment of the present invention makes it possible to increase the multi-channel sampling rate, by optimizing the circuit structure such that the touch device comprises the driving module which drives at least two infrared-receiving diodes to receive the infrared light emitted from the same infrared light-emitting diode simultaneously and the control module which controls the first-stage processing circuits to filter out the interfering light signals from the received signals of the at least two infrared-receiving diodes to obtain the valid signals and outputs all of the valid signals to the second-stage processing circuit for processing.

The touch system according to an embodiment of the present invention makes it possible to increase the multi-channel sampling rate, by optimizing the circuit structure of the touch screen such that the received signals of the at least two infrared-receiving diodes which receive the infrared light emitted from the same infrared light-emitting diode simultaneously can be processed by the first-stage processing circuit and outputted via the same multiplexer to the second-stage processing circuit for processing.

The interactive display according to an embodiment of the present invention makes it possible to increase the multi-channel sampling rate, by optimizing the circuit structure of the touch screen such that the received signals of the at least two infrared-receiving diodes which receive the infrared light emitted from the same infrared light-emitting diode simultaneously can be processed by the first-stage processing circuit and outputted via the same multiplexer to the second-stage processing circuit for processing.

Other aspects and/or advantages of the present invention will be described partially in the following description, which are obvious in this description or may be obtained by carrying out the present invention.

BRIEF DESCRIPTION OF THE DRAWINGS

The present invention can be better understood by reading the following detailed description with reference to the following drawings. It should be noted that each detail in the drawings is not drawn proportionally. On the contrary, for the sake of clarity, various details are arbitrarily magnified or minified, in which.

DETAILED DESCRIPTION OF THE PREFERRED EMBODIMENT

The embodiments of the present invention will be described below in detail in conjunction with the drawings, wherein the same reference number refers to the same element.

Figure 1:
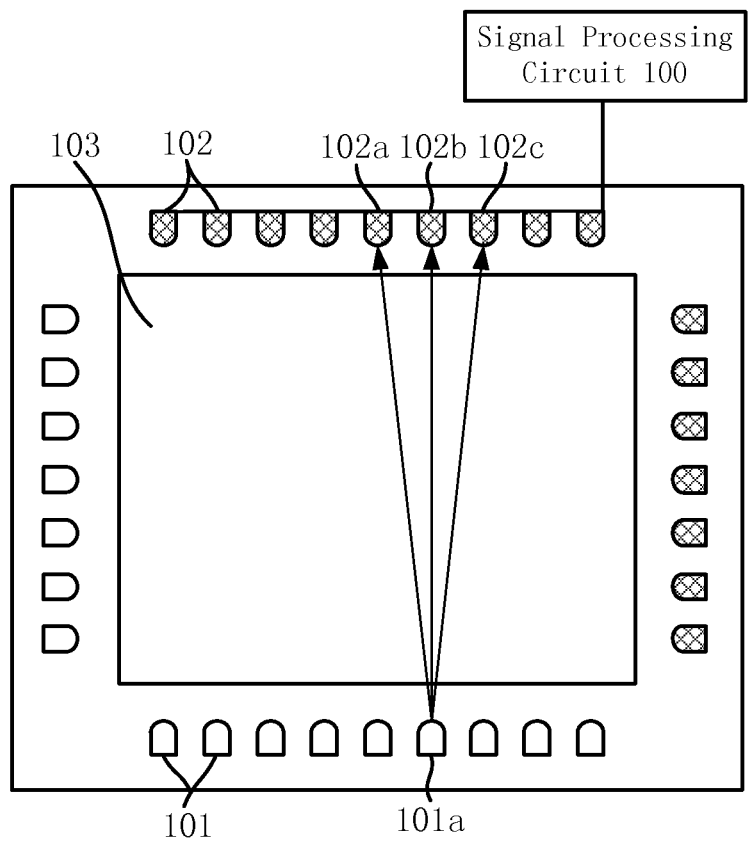
FIG. 1 is a schematic structural diagram of the touch screen according to a first embodiment of the present invention.
Figure 2:
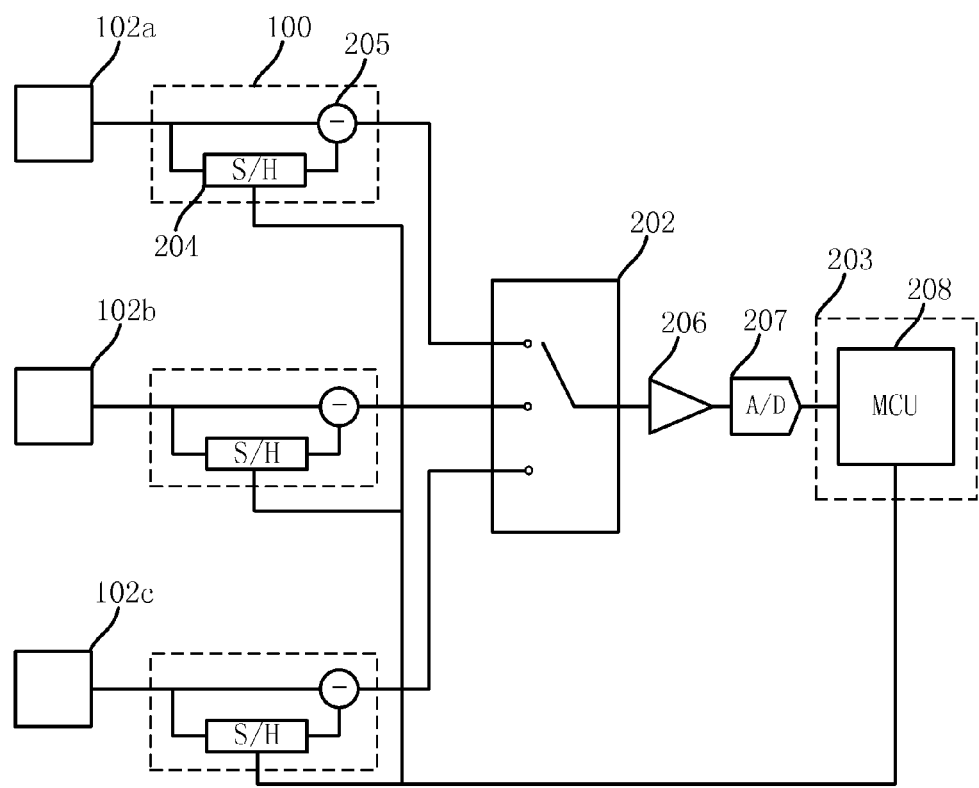
FIG. 2 is a circuitry diagram of the touch screen according to the first embodiment of the present invention.
Figure 3:
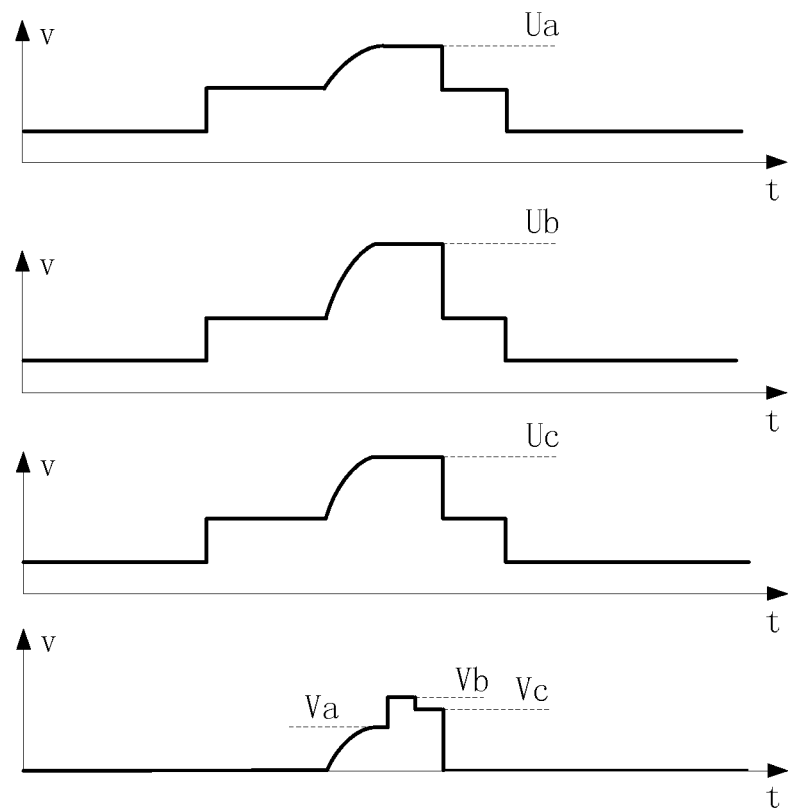
FIG. 3 is a time sequence diagram of processing the received signals according to the first embodiment of the present invention.

As shown in FIG. 1, the touch screen of the first embodiment of the present invention comprises the infrared-emitting diodes 101, the infrared-receiving diodes 102, the touch detection region 103, and the first-stage processing circuit 100. The infrared light emitted from the infrared light-emitting diode (e.g. the infrared-emitting diode 101a shown in FIG. 1) can be received by at least two infrared-receiving diodes (e.g. the infrared-receiving diodes 102a, 102b and 102c shown in FIG. 1). Referring to FIG. 2, the first-stage processing circuits 100 filter out the interfering light signals from the received signals of the at least two infrared-receiving diodes (e.g. the infrared-receiving diodes 102a, 102b and 102c shown in FIG. 2), which receive the infrared light emitted from the same infrared light-emitting diode simultaneously, and then output the signals via the multiplexer 202 to the second-stage processing circuit 203 for processing. The number of the first-stage processing circuits 100 equals to the number of the infrared-receiving diodes 102, and there is a one-to-one relationship between the first-stage processing circuits 100 and the infrared-receiving diodes 102. The first-stage processing circuit 100 comprises the sampling holding circuit (S/H) 204 and the analog subtractor 205. Referring to FIG. 3, the interfering light signal can be filtered out effectively from the received signal (such as the received signals Va, Vb, Vc shown in FIG. 3) by the sampling holding circuit 204 and the analog subtractor 205 of the first-stage processing circuit 100, to obtain the valid signal (such as the valid signals Ua, Ub, Uc shown in FIG. 3). The valid signals are outputted via the multiplexer 202 to the second-stage processing circuit for processing. The multiplexer 202 can be a multi-channel-to-one-channel multiplexer. The second-stage processing circuit 203 may comprise the microprocessor 208. The second-stage processing circuit 203 can analyze the valid signals obtained by filtering out the interfering light signals to implement or assist in implementing the positioning of a touch object in the touch detection region 103. In addition, the amplifier 206 and there A/D converter 207 may be provided between the multiplexer 202 and the second-stage processing circuit 203, if necessary. Preferably, the amplifier 206 can be an automatic gain amplifier.

Figure 4:
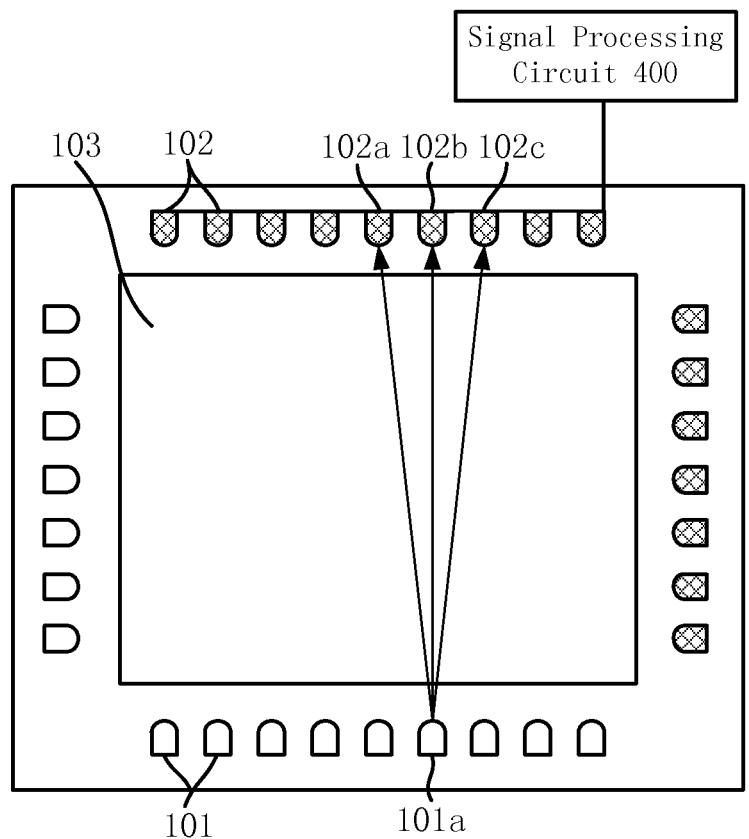
FIG. 4 is a schematic structural diagram of the touch screen according to a second embodiment of the present invention.
Figure 5:
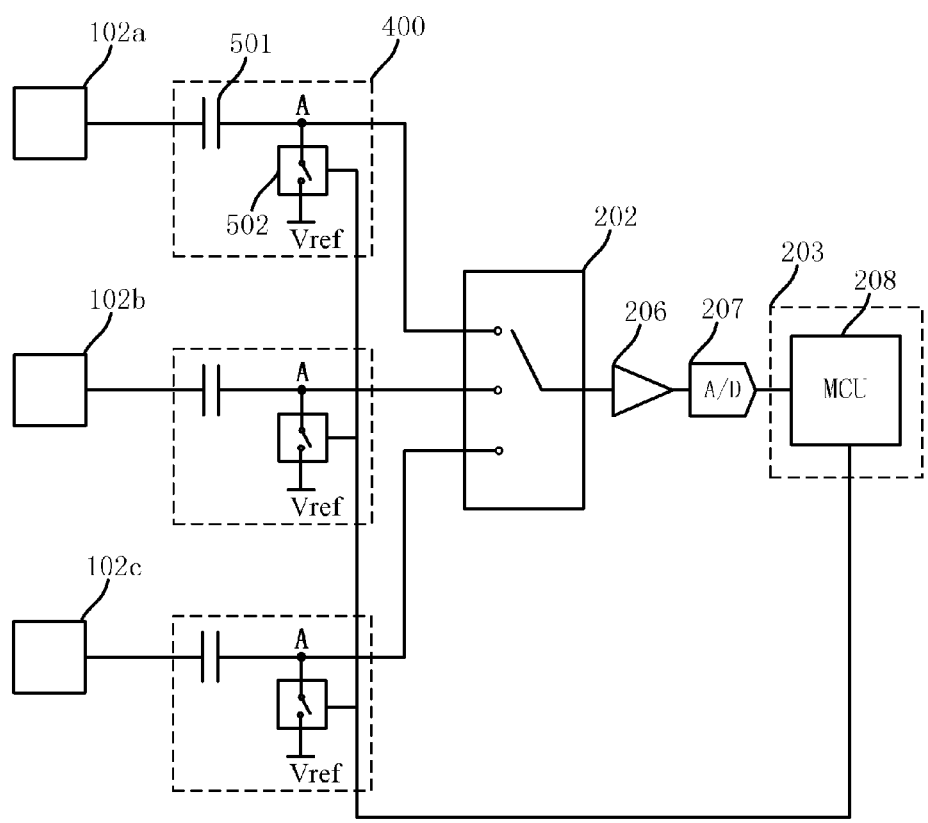
FIG. 5 is a circuitry diagram of the touch screen according to the second embodiment of the present invention.
Figure 6:
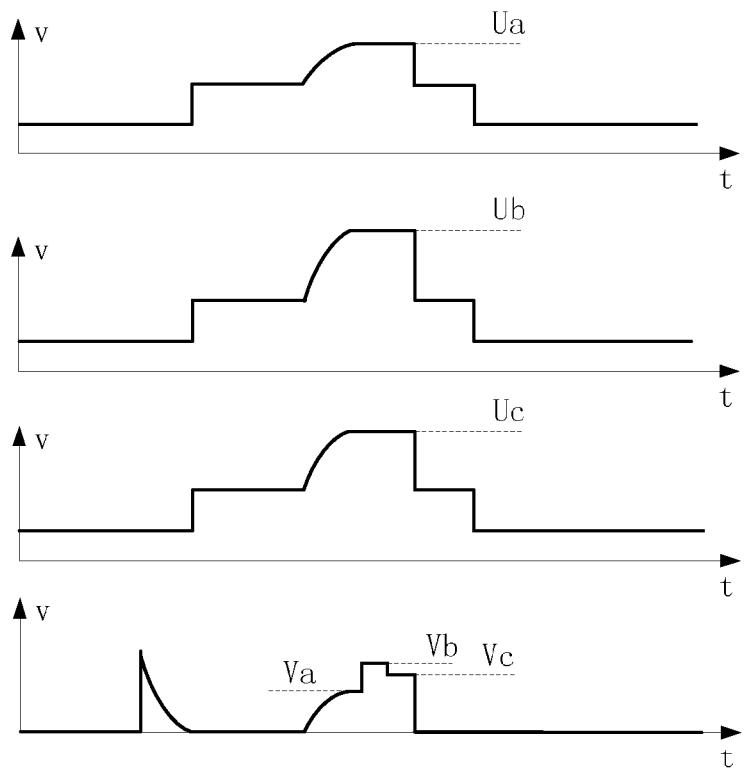
FIG. 6 is a time sequence diagram of processing the received signals according to the second embodiment of the present invention.

As shown in FIG. 4, the touch screen of the second embodiment of the present invention comprises the infrared-emitting diodes 101, the infrared-receiving diodes 102, the touch detection region 103, and the first-stage processing circuit 100. The infrared light emitted from at least one infrared light-emitting diode (e.g. the infrared-emitting diode 101a shown in FIG. 3) can be received by at least two infrared-receiving diodes (e.g. the infrared-receiving diodes 102a, 102b and 102c shown in FIG. 3). Referring to FIG. 5, the first-stage processing circuits 400 filter out the interfering light signal from the received signals of the at least two infrared-receiving diodes 102, which receive the infrared light emitted from the same infrared light-emitting diode simultaneously, and then output the signals via the multiplexer 202 to the second-stage processing circuit 203 for processing. The number of the first-stage processing circuits 400 equals to the number of the infrared-receiving diodes 102, and there is a one-to-one relationship between the first-stage processing circuits 400 and the infrared-receiving diodes 102. The first-stage processing circuit 400 comprises the capacitor 501 and the analog switch 502. The capacitor 501 is connected between the infrared-receiving diode 102 and the multiplexer 202. One end of the analog switch 502 is connected to the circuit node A between the capacitor 501 and the multiplexer 202, and the other end is connected to the reference potential Vref. Preferably, the reference potential may be set as Vref=0V (i.e. the other end of the analog switch 502 is connected directly to the ground). Referring to FIG. 6, when the infrared-emitting diode does not work, the analog switch 502 will be closed to connect the reference potential Vref, at this time, the signals at both sides of the capacitor 501 have the stable values. When the infrared-emitting diode begins to work, the analog switch 502 will be opened, and at this time, the signal at the input end of the capacitor 501 is the received signal (e.g. the received signals Va, Vb, Vc shown in FIG. 6) compring the valid signal and the interfering light signal. The signal at the output end of the capacitor 501 is (the reference voltage Vref+the valid signal). When the reference potential Vref=0, the signal at the output end is the valid signal (e.g. the valid signals Ua, Ub, Uc shown in FIG. 6). In fact, in the first-stage processing circuit 400 with such structure, the capacitor and the analog switch can function as the sampling holding circuit and the analog subtractor, thus the circuit structure can be simplified and the production cost can be reduced. The multiplexer 202 can be a multi-channel-to-one-channel multiplexer. The second-stage processing circuit 203 may comprise the microprocessor 208, and can analyze the valid signals obtained by filtering out the interfering light signals to implement or assist in implementing the positioning of the touch object in the touch detection region. In addition, referring to FIG. 2, the amplifier 206 and the A/D converter 207 may be provided between the multiplexer 202 and the second-stage processing circuit 203. Preferably, the amplifier 206 is an automatic gain amplifier.

It should be noted that the first and second embodiments only describe that the infrared light emitted by at least one infrared-emitting diode is received by at least two infrared-receiving diodes, but the present invention is not limited thereto. Indeed, the present invention can be applied to any infrared touch screen utilizing the infrared-emitting diodes and infrared-receiving diodes to implement or assist in implementing the positioning of an object, or a mixed touch screen (such as an optical touch screen having the infrared-emitting diodes and infrared-receiving diodes, a capacitive touch screen, a resistance touch screen and the like), or any other types of man-machine interactive devices based on the above infrared touch screen and mixed touch screen (such as an ATM machine, an interactive display).

Figure 7:
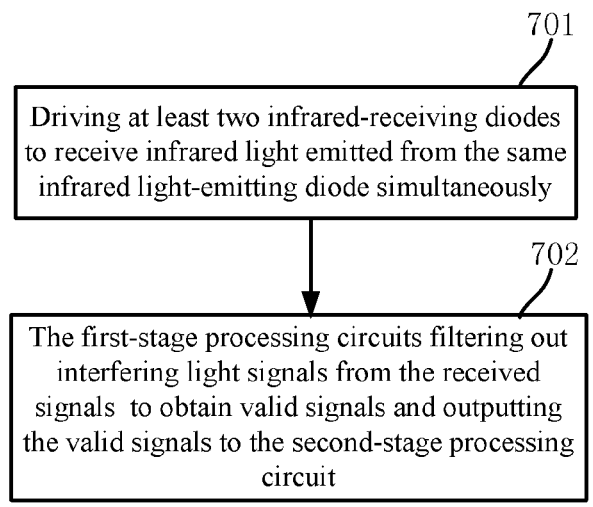
FIG. 7 is a schematic flowchart of the method for increasing multi-channel sampling rate of the touch screen according to an embodiment of the present invention.

FIG. 7 illustrates a flowchart of the method for increasing multi-channel sampling rate of the touch screen according to an embodiment of the present invention. The method can comprise the following steps.

In step 701, at least two infrared-receiving diodes are driven to receive the infrared light emitted from the same infrared light-emitting diode simultaneously.

In the case that this step is performed by the touch screen according to the first embodiment of the present invention, the microprocessor 208 in the second-stage processing circuit 203 drives the at least two infrared-receiving diodes (e.g. the infrared-receiving diodes 102a, 102b and 102c shown in FIG. 1) to receive the infrared light emitted from the same infrared light-emitting diode (such as the infrared-receiving diodes 101a shown in FIG. 1) simultaneously.

In step 702, the first-stage processing circuits filter out the interfering light signals from the received signals of the at least two infrared-receiving diodes to obtain the valid signals, and output all of the valid signals to the second-stage processing circuit for processing.

In the case that this step is performed by the touch screen according to the first embodiment of the present invention, the microprocessor 208 in the second-stage processing circuit 203 controls the first-stage processing circuits 100 to filter out the interfering light signals from the received signal of each of the infrared-receiving diodes simultaneously to obtain the valid signals, and output all of the valid signals via the multiplexer 202 to the second-stage processing circuit for processing. The number of the first-stage processing circuit equals to the number of the infrared-receiving diode, and there is a one-to-one relationship between the first-stage processing circuits and the infrared-receiving diodes. The first-stage processing circuit can comprise the sampling holding circuit 204 and the analog subtractor 205. Referring to FIG. 3, the interfering light signal is filtered out by the sampling holding circuit 204 and the analog subtractor 205 of the first-stage processing circuit 100 from the received signal (e.g. the received signals Va, Vb, Vc shown in FIG. 3), to obtain the valid signal (such as the valid signals Ua, Ub, Uc shown in FIG. 3), and the valid signal is outputted via the multiplexer to the second-stage processing circuit for processing. Assuming that the response time of the first-stage processing circuit 100 to filter out the interfering light from the received signal of each infrared-receiving diode is t1, and the response time of the multiplexer to perform a multiplexing operation is t0, then in the case that there are one infrared-emitting diode and n (n≥2) infrared-receiving diodes, with the method of multi-channel sampling for the touch screen of the present embodiment, the total time is T1=t1+(n−1)*t0. Compared with the total time T0=nt1+(n−1)*t0 obtained by employing the existing method, T1−T0=(1−n) t1<0, i.e. T1<T0, thus the multi-channel sampling rate can be increased.

In the case that this step is performed by the touch screen according to the second embodiment of the present invention, the microprocessor in the second-stage processing circuit 203 controls the first-stage processing circuits 400 to filter out the interfering light signal from the received signal of each of the infrared-receiving diodes simultaneously to obtain the valid signals, and output all of the valid signals via the multiplexer 202 to the second-stage processing circuit for processing. The number of the first-stage processing circuits equals to the number of the infrared-receiving diodes, and there is a one-to-one relationship between the first-stage processing circuits and the infrared-receiving diodes. The first-stage processing circuit 400 comprises the capacitor 501 and the analog switch 502. The capacitor 501 is connected between the infrared-receiving diode 102 and the multiplexer 202. One end of the analog switch 502 is connected to the circuit node A between the capacitor 501 and the multiplexer 202, and the other end is connected to the reference potential Vref. All of the analog switches 502 can be connected to the reference potential Vref. Preferably, the reference potential may be set as Vref=0V (i.e., the other end of the analog switch 502 is connected directly to the ground). When the infrared-emitting diode does not work, the analog switch 502 will be closed to connect the reference potential Vref, and the signals at both sides of the capacitor 501 have the stable values. When the infrared-emitting diode begins to work, the analog switch 502 will be opened, and at this time, the signal at the input end of the capacitor 501 is the received signal (such as the received signals Va, Vb, Vc shown in FIG. 6) which comprises the valid signal and the interfering light signal. The signal at the output end of the capacitor 501 is (the reference voltage Vref+the valid signal). When the reference potential Vref=0, the signal at the output end is the valid signal (such as the valid signals Ua, Ub, Uc shown in FIG. 6), and the valid signal is outputted via the multiplexer to the second-stage processing circuit for processing. Assuming that the response time of the first-stage processing circuit 400 to filter out the interfering light signal from the received signal of each infrared-receiving diode is t2, and the response time of the multiplexer to perform a multiplexing operation is t0, then in the case that there are one infrared-emitting diode and n (n≥2) infrared-receiving diodes, with the method of multi-channel sampling for the touch screen of the present embodiment, the total time is T2=t2+(n−1)*t0. Compared with the total time T0=nt1+(n−1)*t0 obtained by employing the existing method, T2−T0=t2−nt1, since the first-stage processing circuit 400 is simpler than the first-stage processing circuit 100 in structure, t2<t1, and then T2<T1<T0, thus the multi-channel sampling rate can be further increased.

Figure 8:
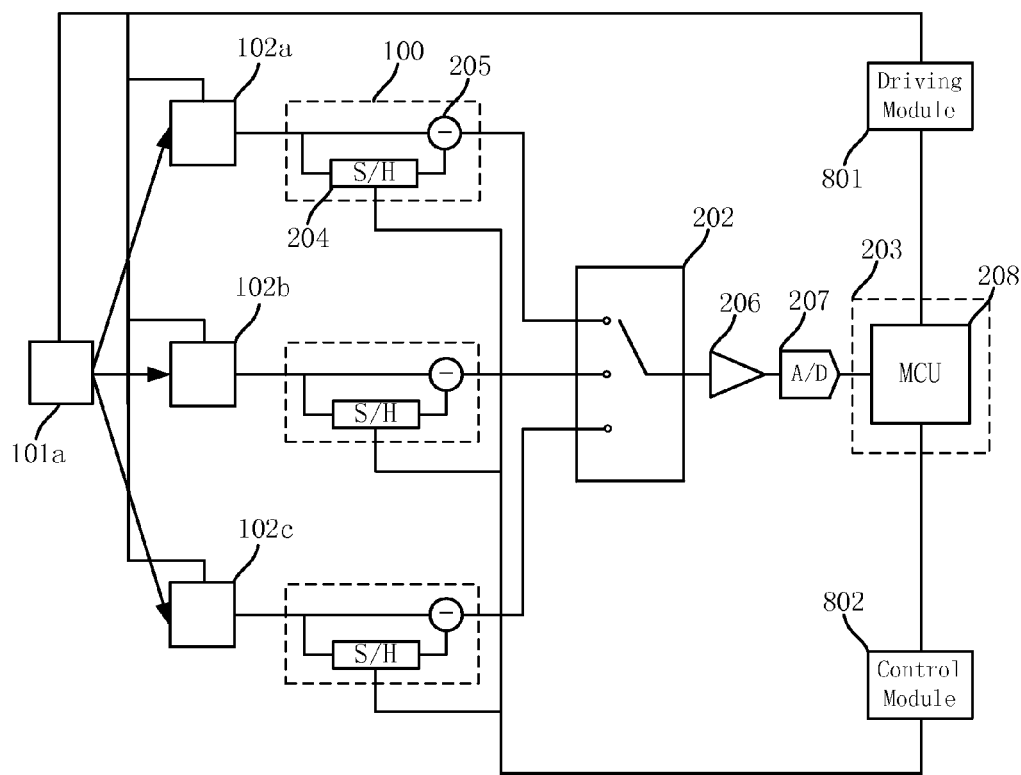
FIG. 8 is a circuitry diagram of the touch device according to a first embodiment of the present invention.

As shown in FIG. 8, the touch device of the first embodiment of the present invention comprises the infrared-emitting diodes, the infrared-receiving diodes, the touch detection region, the first-stage processing circuits and the second-stage processing circuit, and further comprises the driving module 801 which drives at least two infrared-receiving diodes (e.g. the infrared-receiving diodes 102a, 102b and 102c shown in FIG. 8) to receive the infrared light emitted from the same infrared light-emitting diode (e.g. the infrared-emitting diode 101a shown in FIG. 8) simultaneously, and the control module 802 which controls the first-stage processing circuits 100 to filter out the interfering light signals from the received signals of the at least two infrared-receiving diodes (e.g. the infrared-receiving diodes 102a, 102b and 102c shown in FIG. 8) to obtain the valid signals and output all of the valid signals via the multiplexer 202 to the second-stage processing circuit 203 for processing. The number of the first-stage processing circuits 100 equals to the number of the infrared-receiving diodes, and there is a one-to-one relationship between the first-stage processing circuits 100 and the infrared-receiving diodes. The first-stage processing circuit 100 comprises the sampling holding circuit (S/H) 204 and the analog subtractor 205. The interfering light signal can be filtered out effectively from the received signal by the sampling holding circuit 204 and the analog subtractor 205 of the first-stage processing circuit 100. The second-stage processing circuit 203 may comprise the microprocessor 208. The second-stage processing circuit 203 can analyze the received valid signals obtained by filtering out the interfering light signals to implement or assist in implementing the positioning of a touch object in the touch detection region. In addition, the amplifier 206 and the A/D converter 207 may be provided between the multiplexer 202 and the second-stage processing circuit 203, if necessary. Preferably, the amplifier 206 can be an automatic gain amplifier. In fact, the control module 802 can control the first-stage processing circuits 100 to filter out the interfering light signals from the received signals of the at least two infrared-receiving diodes (e.g. the infrared-receiving diodes 102a, 102b and 102c shown in FIG. 8) simultaneously to obtain the valid signals, and output all of the valid signals via the multiplexer 202 to the second-stage processing circuit 203 for processing.

Figure 9:
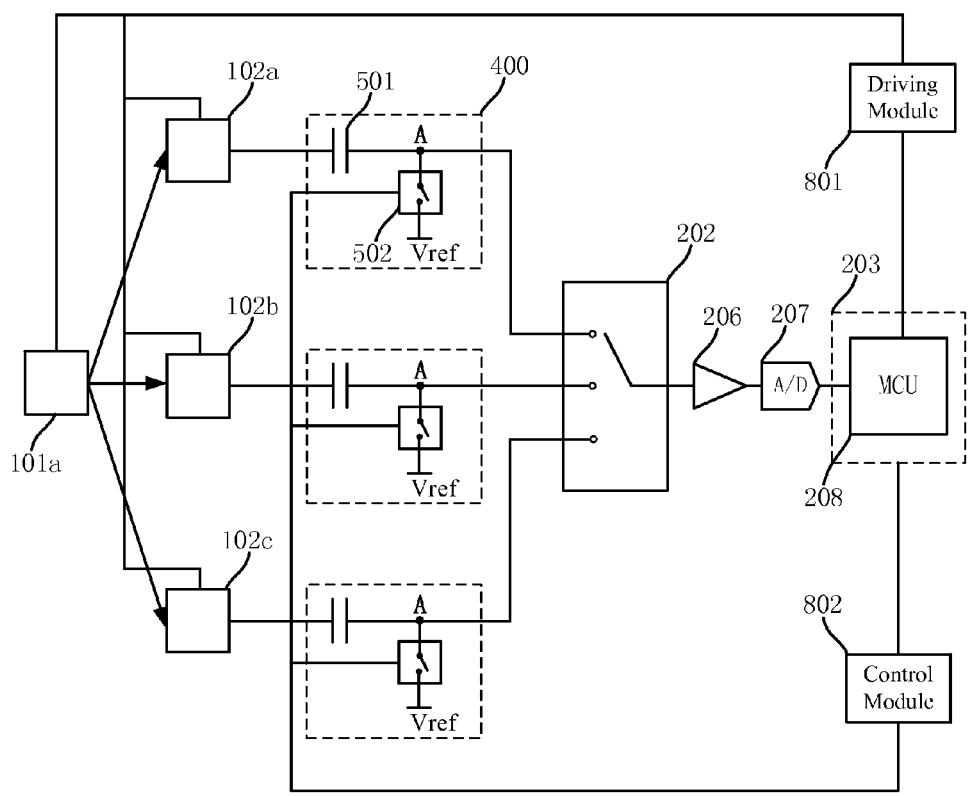
FIG. 9 is a circuitry diagram of the touch device according to a second embodiment of the present invention.

As shown in FIG. 9, the touch device of the second embodiment of the present invention comprises the infrared-emitting diodes, the infrared-receiving diodes, the touch detection region, the first-stage processing circuits and the second-stage processing circuit, and further comprises the driving module 801 which drives at least two infrared-receiving diodes (e.g. the infrared-receiving diodes 102a, 102b and 102c shown in FIG. 9) to receive the infrared light emitted from the same infrared light-emitting diode (e.g. the infrared-emitting diode 101a shown in FIG. 9) simultaneously, and the control module 802 which controls the first-stage processing circuits 400 to filter out the interfering light signals in the received signals from the at least two infrared-receiving diodes (e.g. the infrared-receiving diodes 102a, 102b and 102c shown in FIG. 9) to obtain the valid signals and output all of the valid signals via the multiplexer 202 to the second-stage processing circuit 203 for processing. The number of the first-stage processing circuits 400 equals to the number of the infrared-receiving diodes, and there is a one-to-one relationship between the first-stage processing circuits 400 and the infrared-receiving diodes. The first-stage processing circuit 400 comprises the capacitor 501 and the analog switch 502. The capacitor 501 is connected between the infrared-receiving diode 102 and the multiplexer 202. One end of the analog switch 502 is connected to the circuit node A between the capacitor 501 and the multiplexer 202, and the other end is connected to the reference potential Vref. All of the analog switches 502 are connected to the same reference potential Vref. Preferably, the reference potential may be set as Vref=0V (i.e., the other end of the analog switch 502 is connected directly to the ground). When the infrared-emitting diode does not work, the analog switch 502 will be closed to connect the reference potential Vref, and the signals at both sides of the capacitor 501 have stable values. When the infrared-emitting diode begins to work, the analog switch 502 is opened, and at this time, the signal at the input end of the capacitor 501 is the received signal which comprises the valid signal and the interfering light signal. The signal at the output end of the capacitor 501 is (the reference voltage Vref+the valid signal). When the reference potential Vref=0, the signal at the output end is the valid signal. In fact, in the first-stage processing circuit 400 with such structure, one capacitor and one analog switch can function as the sampling holding circuit and the analog subtractor, thus the circuit structure can be simplified and the production cost can be reduced. The multiplexer 202 can be a multi-channel-to-one-channel multiplexer. The second-stage processing circuit 203 can comprise the microprocessor 208, and can analyze the valid signals obtained by filtering out the interfering light signals to implement or assist in implementing the positioning of a touch object in the touch detection region. In addition, the amplifier 206 and the A/D converter 207 can be provided between the multiplexer 202 and the second-stage processing circuit 203. Preferably, the amplifier 206 can be an automatic gain amplifier. In practice, the control module 802 can control the first-stage processing circuits 100 to filter out the interfering light signals from the received signals of the at least two infrared-receiving diodes (e.g. the infrared-receiving diodes 102a, 102b and 102c shown in FIG. 8) simultaneously to obtain the valid signals, and output all of the valid signals via the multiplexer 202 to the second-stage processing circuit 203 for processing.

Figure 10:
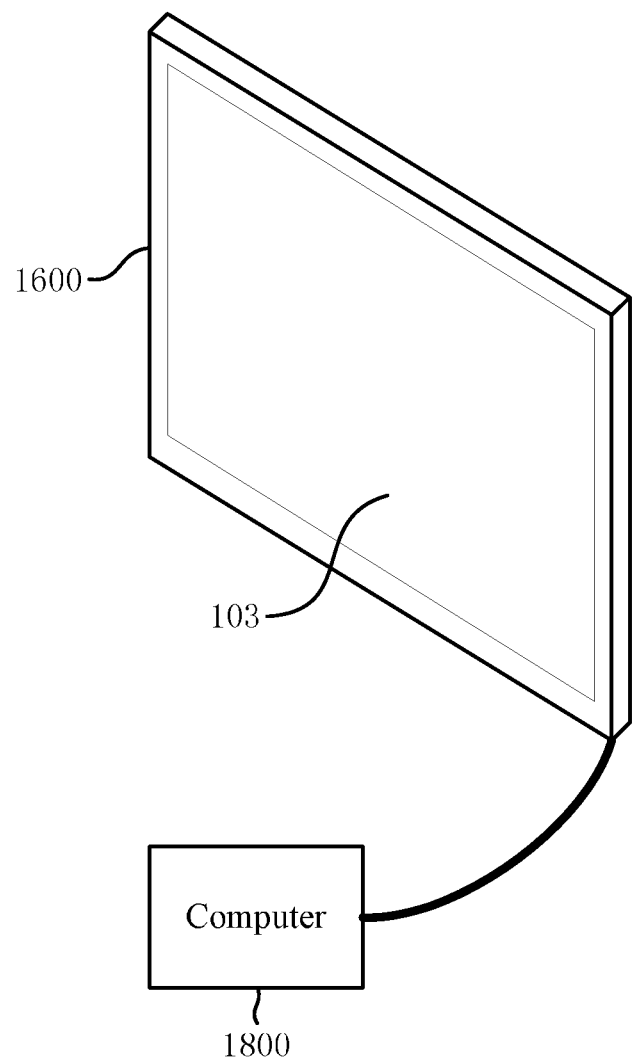
FIG. 10 is a schematic diagram of the touch system according to an embodiment of the present invention.

The present invention further provides a touch system, which comprises the above-described touch screen. FIG. 10 illustrates a schematic diagram of the touch system of an embodiment. The touch system comprises at least a computer 1800 to which the touch screen 1600 is connected. A user can control the computer 1800 to execute one or more application programs by performing a touch operation within the touch detection region 103 of the touch screen 1600. This touch system can be applied to the man-machine interactive devices such as ATM machines, subway self-service machines and the like.

Figure 11:
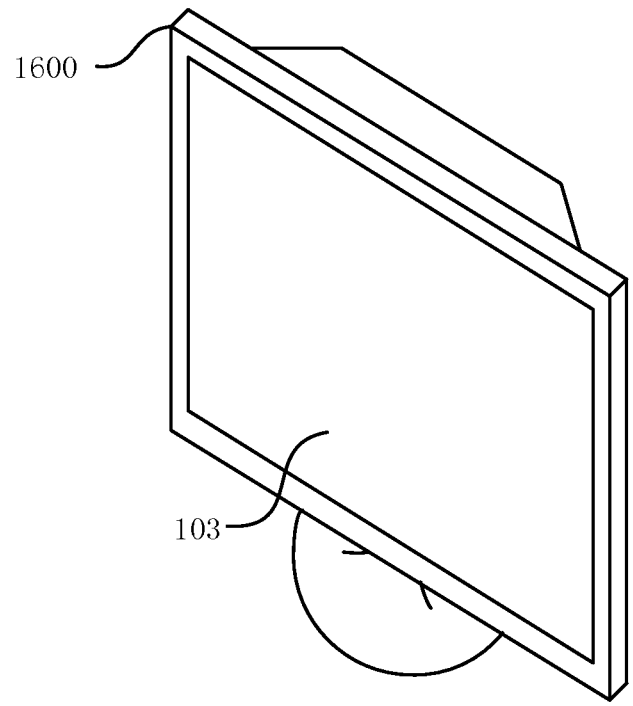
FIG. 11 is a perspective schematic diagram of the interactive display according to an embodiment of the present invention.
Figure 12:
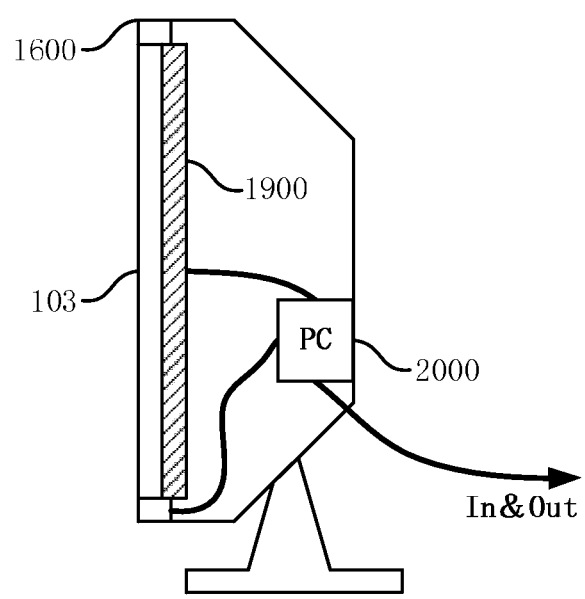
FIG. 12 is a cross-sectional schematic diagram of the interactive display shown in FIG. 11.

The present invention further provides an interactive display, which comprises the above infrared touch screen and a display panel for displaying an image. FIG. 11 and FIG. 12 show a schematic diagram of the interactive display of an embodiment. The interactive display comprises the touch screen 1600, the display panel 1900 and a general purpose computing device in the form of a conventional built-in PC 2000. The touch screen 1600 is located in the front of the display panel 1900 (in a direction towards the user). The PC 2000 can be connected to the touch screen 1600 and the display panel 1900 respectively, and can also be connected to other computer, a video input device (such as VCD, DVD, etc.) or a peripheral equipment (such as speaker, printer, etc.) respectively. This interactive display has functions of video output and optical input, and may provide the display through the display panel 1900, and interact with the user with respect to the information input and control of software programs. The display panel 1900 may be a liquid crystal display panel (LCD) or an organic light display panel. The touch detection region 103 of the touch screen 1600 can be made of a transparent material such as glass, acrylic, etc.

Although the embodiments of the present invention have been described and specified in detail, those skilled in the art should appreciate that changes may be made to these embodiments without departing the spirit and principles of the present invention, and fall within the scope defined in the claims.

What is claimed is:

1. A touch screen, comprising:
   infrared-emitting diodes,
   infrared-receiving diodes,
   a touch detection region,
   a multi-channel-to-one-channel multiplexer,
   filtering circuits,
   a processing circuit, and
   an amplifier and an A/D converter connected in series between the multi-channel-to-one-channel multiplexer and the processing circuit,
   wherein at least two of the infrared-receiving diodes are arranged to receive infrared light from the same infrared light-emitting diode simultaneously,
   wherein the number of the filtering circuits equals the number of the infrared-receiving diodes, and there is a one-to-one relationship between the filtering circuits and the infrared-receiving diodes,
   wherein the filtering circuits are configured to filter out interfering light signals from signals received by said at least two of the infrared-receiving diodes simultaneously, and then output the filtered signals to the multi-channel-to-one-channel multiplexer before relaying to the processing circuit for processing.

2. The touch screen according to claim 1, wherein the processing circuit comprises a microprocessor.

3. The touch screen according to claim 1, wherein the amplifier is an automatic gain amplifier.

4. The touch screen according to claim 1, wherein the filtering circuits each comprises a sampling holding circuit and an analog subtractor.

5. The touch screen according to claim 1, wherein the filtering circuits each comprises a capacitor and an analog switch, the capacitor is connected between its related infrared-receiving diode and the multi-channel-to-one-channel multiplexer, one end of the analog switch is connected to a circuit node between the capacitor and the multi-channel-to-one-channel multiplexer, and the other end of the analog switch is connected to a reference potential.

6. The touch screen according to claim 5, wherein the analog switch is configured to be closed to connect the circuit node to the reference potential when its related infrared-emitting diode does not emit the infrared light, and the analog switch is configured to be opened when its related infrared-emitting diode emits the infrared light.

7. The touch screen according to claim 1, further comprising:
   a driving module configured to drive the at least two of the infrared-receiving diodes to receive the infrared light from the same infrared light-emitting diode simultaneously; and
   a control module configured to control the filtering circuits to filter out the interfering light signals from the signals received by said at least two of the infrared-receiving diodes to obtain valid signals, and output the valid signals to the processing circuit.

8. An interactive display comprising a display panel and a touch screen, wherein the touch screen is the touch screen of claim 1.

9. A method of multi-channel sampling for a touch screen, the touch screen comprising infrared-emitting diodes, infrared-receiving diodes, a touch detection region, filtering circuits, a multi-channel-to-one-channel multiplexer, a processing circuit, and an amplifier and an A/D converter connected in series between the multi-channel-to-one-channel multiplexer and the processing circuit, wherein the number of the filtering circuits equals the number of the infrared-receiving diodes, and there is a one-to-one relationship between the filtering circuits and the infrared-receiving diodes, the method comprising:

driving at least two of the infrared-receiving diodes to receive infrared light emitted from the same infrared light-emitting diode simultaneously;

filtering out, by the filtering circuits corresponding to said at least two of the infrared-receiving diodes, interfering light signals from signals received from said at least two of the infrared-receiving diodes simultaneously to obtain filtered signals, and outputting the filtered signals to the multi-channel-to-one-channel multiplexer before relaying to the processing circuit for processing.

10. The method according to claim 9, wherein the amplifier is an automatic gain amplifier.

11. The method according to claim 9, wherein the filtering circuits each comprises a sampling holding circuit and an analog subtractor.

12. The method according to claim 9, wherein the filtering circuits each comprises a capacitor and an analog switch, the capacitor is connected between its related infrared-receiving diode and the multi-channel-to-one-channel multiplexer, one end of the analog switch is connected to a circuit node between the capacitor and the multi-channel-to-one-channel multiplexer, and the other end of the analog switch is connected to a reference potential.

13. The method according to claim 12, wherein the analog switch is configured to be closed to connect the circuit node to the reference potential when its related infrared-emitting diode does not emit the infrared light, and the analog switch is configured to be opened when its infrared-emitting diode emits the infrared light.

14. The method according to claim 12, wherein the analog switches are connected to the same reference potential.

* * * * *